United States Patent
Li et al.

(10) Patent No.: US 11,861,210 B2
(45) Date of Patent: Jan. 2, 2024

(54) DATA PROCESSING METHOD AND APPARATUS FOR SOLID STATE DISK

(71) Applicant: SHENZHEN DAPU MICROELECTRONICS CO., LTD., Shenzhen (CN)

(72) Inventors: Weijun Li, Shenzhen (CN); Yan Wang, Shenzhen (CN); Wenjiang Li, Shenzhen (CN)

(73) Assignee: SHENZHEN DAPU MICROELECTRONICS CO., LTD., Shenzhen (CN)

( * ) Notice: Subject to any disclaimer, the term of this patent is extended or adjusted under 35 U.S.C. 154(b) by 239 days.

(21) Appl. No.: 17/520,233

(22) Filed: Nov. 5, 2021

(65) Prior Publication Data
US 2022/0057962 A1    Feb. 24, 2022

Related U.S. Application Data

(63) Continuation of application No. PCT/CN2020/085296, filed on Apr. 17, 2020.

(30) Foreign Application Priority Data

May 9, 2019    (CN) .......................... 201910385547.0

(51) Int. Cl.
G06F 3/06    (2006.01)

(52) U.S. Cl.
CPC ............ *G06F 3/0655* (2013.01); *G06F 3/061* (2013.01); *G06F 3/0679* (2013.01)

(58) Field of Classification Search
CPC ...... G06F 3/0655; G06F 3/061; G06F 3/0679; G06F 3/0658; G06N 3/02; G06N 3/04
See application file for complete search history.

(56) References Cited

U.S. PATENT DOCUMENTS

2011/0238838 A1*  9/2011  Avalani .................. G06F 9/505
                                                    709/226
2020/0118675 A1*  4/2020  Schriver ............... G06Q 10/20

FOREIGN PATENT DOCUMENTS

| CN | 106250064 A | 12/2016 |
| CN | 109635150 A | 4/2019 |

OTHER PUBLICATIONS

Yu, Qinghua: "Micron Launches New Flagship NVMe Solid-State Storage Series, Achieving Ultra-High Data Access Speed" p. 021, vol. 08 of 2017, Automobile Parts (4 pages).

* cited by examiner

*Primary Examiner* — Ernest Unelus
(74) *Attorney, Agent, or Firm* — Bayes PLLC

(57) ABSTRACT

Disclosed is a method for data processing applied to a solid state drive, a computer device and a computer-readable storage medium. The method includes acquiring an interface protocol command received by the solid state drive. The method also includes parsing the interface protocol command to obtain I/O information from the interface protocol command. The I/O information includes at least an I/O timestamp, an I/O type, and an I/O size. The method further includes invoking machine learning based on the I/O information to predict I/O information of a first future time period, so that a processor of the solid state drive is configured to proactively execute management functions according to the prediction results.

15 Claims, 4 Drawing Sheets

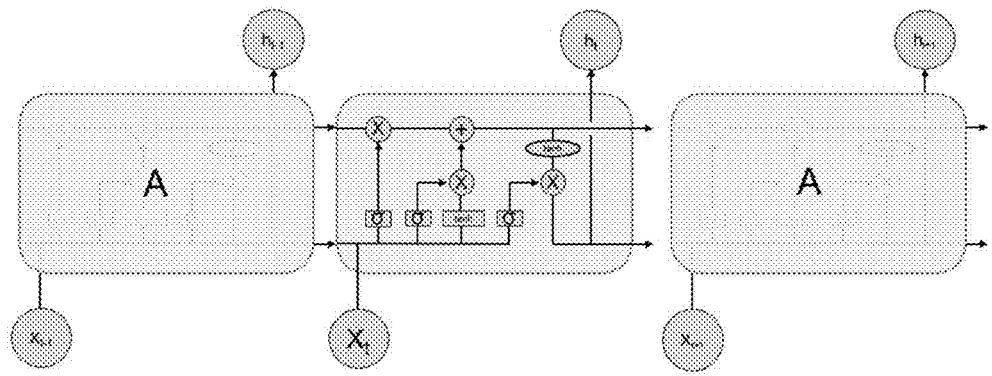
FIG.5
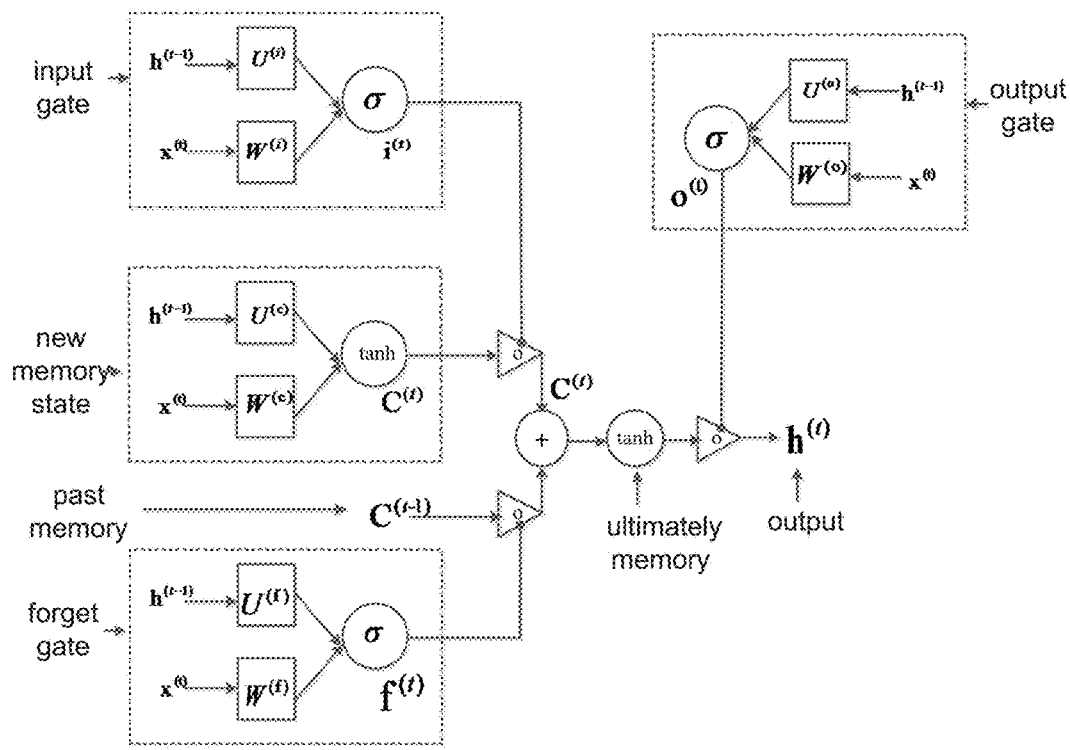
FIG.6
assessing the prediction results by using a first formula to evaluate the accuracy of the prediction results. ⟵ 701
FIG.7

DATA PROCESSING METHOD AND APPARATUS FOR SOLID STATE DISK

CROSS-REFERENCE TO RELATED APPLICATIONS

The present application is a continuation of International Application No. PCT/CN2020/085296, filed on Apr. 17, 2020, which claims priority to Chinese Patent Application No. 201910385547.0, filed on May 9, 2019, the entire contents of which are incorporated herein by reference.

TECHNICAL FIELD

The present disclosure relates to the field of data processing, and more particularly to data processing method and apparatus for solid state disk.

BACKGROUND

Flash Translation Layer (FTL) is the core of SSD controller, which determines the service life, performance and reliability of SSD.

How to implement an efficient FTL is a problem that has always been optimized, for example, how to optimize mapping table under an environment of limited hardware resources, how to implement buffer management, how to implement efficient garbage collection (GC), how to implement wear balance, etc.

In the existing technology, most of the above management strategies are passive. That is, executing buffer scheduling according to the received I/O operation passively or executing garbage collection passively. However, these passive processing strategies have certain limitations in the implementation of the efficient FTL.

SUMMARY OF THE DISCLOSURE

The present disclosure provides a method for data processing applied to a solid state drive, a computer device and a computer-readable storage medium.

A first aspect of the embodiment of the present disclosure provides a method for data processing applied to a solid state drive. The method includes acquiring an interface protocol command received by the solid state drive. The method also includes parsing the interface protocol command to obtain I/O information from the interface protocol command. The I/O information includes at least an I/O timestamp, an I/O type, and an I/O size. The method further includes invoking machine learning based on the I/O information to predict I/O information of a first future time period, so that a processor of the solid state drive is configured to proactively execute management functions according to the prediction results.

A second aspect of the embodiment of the present disclosure provides a computer device including a processor. The processor is used to implement a data processing method applied to a solid state drive when executing a computer program. The method includes acquiring an interface protocol command received by the solid state drive. The method also includes parsing the interface protocol command to obtain I/O information from the interface protocol command. The U/O information includes at least an I/O timestamp, an I/O type, and an I/O size. The method further includes invoking machine learning based on the I/O information to predict I/O information of a first future time period, so that a processor of the solid state drive is configured to proactively execute management functions according to the prediction results.

A third aspect of the embodiment of the present disclosure provides a computer-readable storage medium with a computer program stored thereon. When the computer program is executed by a processor, the processor is configured to implement a data processing method applied to a solid state drive. The method includes acquiring an interface protocol command received by the solid state drive. The method also includes parsing the interface protocol command to obtain I/O information from the interface protocol command. The I/O information includes at least an I/O timestamp, an I/O type, and an I/O size. The method further includes invoking machine learning based on the I/O information to predict I/O information of a first future time period, so that a processor of the solid state drive is configured to proactively execute management functions according to the prediction results.

BRIEF DESCRIPTION OF THE DRAWINGS

In order to more clearly illustrate the embodiments of the present disclosure, the drawings to be used in the embodiments will be briefly described below. It is apparent that the drawings in the following description are only some of the embodiments described in the present disclosure.

FIG. 5 is a schematic illustration of the neuron collection in the embodiment of the present disclosure;

FIG. 6 is a schematic illustration of each neuronal cell calculation process in the present disclosure;

FIG. 7 is a schematic view showing a data processing method of a solid state drive according to an embodiment of the present disclosure.

DETAILED DESCRIPTION

Figure 1:
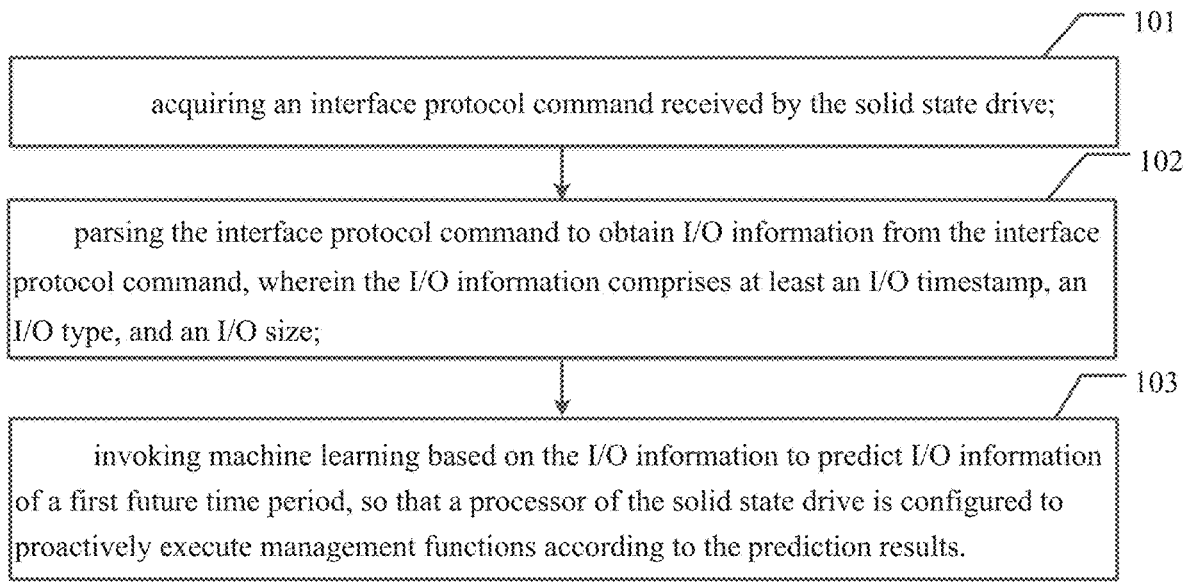
FIG. 1 is a schematic diagram of a data processing method of a solid state drive according to an embodiment of the present disclosure.

The present disclosure provides a data processing method and a device for a solid state drive, which is used to predict the I/O information of the next first period time. The solid state drive processor actively performs the SSD management according to the predicted result, which can improve SSD performance, reduce the response time of data operation.

The technical solutions in the embodiments of the present disclosure are clearly and completely described in the following with reference to the accompanying drawings in the embodiments of the present disclosure. It is obvious that the described embodiments are only a part of the embodiments of the present disclosure, but not all embodiments. All other embodiments obtained by a person skilled in the art based on the embodiments of the present disclosure without creative efforts are within the scope of the present disclosure.

The description and claims of the present disclosure and the terms "first", "second", "third", "fourth", etc. in the above drawings are used to distinguish the similar object without having to describe specific order or sequence. It is to be understood that the data used in this way can be interchanged in appropriate circumstances, so that the embodiments described here can be implemented in an order other than what is graphically or described here. Furthermore, the terms "including" and "having" and any variations are intended to cover non-exclusive inclusion, for example, the process, methods, systems, products, or equipment that contain a series of steps or units are not necessarily limited to what is clearly listed. These steps or units may include other steps or units that are not clearly listed or for these processes, methods, products, or equipment.

Based on the prior art, when realizing efficient SSD management, the delay mechanism (passive buffer scheduling, or passive garbage disposal, etc.), the problem of longer data response time is proposed. A data processing method and device for a solid state drive is used to proactively predict the I/O information of the next first period of time, so that the processor of the SSD actively performs management according to the prediction result to improve the performance of the SSD and reduce the response time of the data operation.

In order to understand, the data processing method of the SSD in the present disclosure will be described below. For details, see FIG. 1, a data processing method for a SSD in an embodiment of this disclosure includes the following steps.

Step 101, acquiring the interface protocol command received by the solid state drive.

The interface protocol command is a communication protocol command between the host and the memory (SSD), mainly with protocol interfaces such as SATA, PCIE, NVME and so on. In some embodiments, the interface protocol command in the present embodiment is an NVME command.

Specifically, NVME is interface specification that connects the memory to the server through the PCIE bus, and NVME enables SSD to communicate with the host system faster. In the present disclosure, the SSD in the process of data interaction with the host system, through the NVME protocol instruction, in order to realize the rapid input and output of the data.

Different from prior art, SSD realizes the configuration of hardware resources and instruction queue management in SSD through passive SSD management (passive buffer scheduling, passive garbage collection, etc.). The configuration of hardware resources includes buffer scheduling and garbage collection and so on. In the embodiment of this disclosure, when the SSD receives the NVME protocol instruction sent by the host system, the data processing device of the SSD acquires the protocol instruction, and performs step 102 according to the protocol instruction to achieve the prediction of I/O information in the first time period in the future, and the SSD processor performs SSD management (such as active buffer scheduling, or active garbage collection) based on the prediction result. The SSD processor in this embodiment can not only realize the function of the main control in the ordinary SSD, but also further realize the function of data processing. It can be regarded as the collection of the master control unit and the data processing unit of the SSD.

Specifically, the data processing device of the SSD can acquired the NVME protocol instruction from the SSD actively, and can also receive the NVME protocol instruction transmitted by the SSD passively, which is not specifically limited.

It should be noted that the data processing apparatus of the SSD in the present disclosure may specifically represent a partial functional module of the SSD processor, or a data processing device independent of SSD, which is not specifically limited.

Step 102, parsing the interface protocol command to obtain I/O information in the protocol command, wherein the I/O information includes at least I/O timestamp, I/O type, and I/O size.

After the data processing device of the solid state drive acquires the interface protocol command, it resolves the interface protocol instruction to obtain I/O information in the protocol instruction, and the resolution action can be specifically manifested as according to a specific protocol specification (such as NVME protocol specification), reading out the U/O information in the protocol instruction, wherein the I/O information includes at least the I/O timestamp, I/O type, and I/O size.

Specifically, the U/O timestamp is the generation time of the U/O operation, and the I/O types includes a reading operation or writing operation, the I/O size is a data length of the reading operation or writing operation.

Step 103, performing machine learning on the I/O information to predict the I/O information in the first time in the future, so that the processor of the solid state drive performs management actively according to the prediction result.

After the data processing apparatus of the solid state drive acquires the I/O information of the current time period, it can learn the I/O information of the previous time period according to the machine learning algorithm to predict the I/O information of the future. The solid state drive processor performs solid state drive management based on the prediction results, thereby increasing the performance of the solid state drive, reducing the response time of data operations.

Among them, the machine learning algorithm includes, but is not limited to, the algorithm, linear regression, time series, etc., which are not limited thereto. And the solid state drive management in this embodiment includes, but is not limited to buffer scheduling, garbage collection, or instruction queue management.

In the embodiment of the present disclosure, the method includes obtaining the interface protocol instruction received by the SSD firstly; and then analyzing the interface protocol instruction to acquire I/O information in the protocol instruction, where the I/O information includes at least I/O time stamp, I/O type and I/O size; and executing machine learning on the I/O information so as to predict I/O information of a future first time period, such that an SSD processor actively executes SSD management according to the prediction result. In the present disclosure, through machine learning algorithm, the I/O information of the first time period in the future can be predicted actively according to the current I/O information, so that the SSD processor can execute the SSD management actively according to the predicted results, so as to improve the performance of the SSD and reduce the response time of data operation.

Based on the embodiments described in FIG. 1, the step 103 is described in detail below; see FIG. 2 for details, which is a schematic diagram of refinement steps of Step 103 in the embodiment of FIG. 1.

Step 201, preprocessing on the I/O information to obtain a first I/O information table.

The data processing device of the SSD obtains the I/O information in the interface protocol instruction (such as NVME protocol instruction) by parsing it, and then preprocesses the I/O information to get the first I/O information table.

Specifically, the specific process of the pretreatment operation will be described in detail in the following embodiments and will not be repeated here.

Step 202, combining multiple adjacent I/O operations in the first I/O information table into one I/O operation.

After obtaining the first I/O information table, the data processing device of the SSD combines several adjacent I/O operations in the first I/O information table into one I/O operation. Merging here can be understood as concatenating the eight adjacent I/Os processed in Table 2 below into one I/O input. In this way, compared with the existing input of one by one operation, multiples I/O can be input and calculated at the same time, which greatly reduces the amount of calculation and meets the demand of real time calculation.

Specifically, you can combine four adjacent I/O operations into one I/O operation, or you can combine eight adjacent I/O operations into one I/O operation. The "multiple" in this embodiment is primarily determined by the processor's processing performance (that is, the processor's computing power), and if the processor's computing power is weak, a larger number of adjacent I/O operations can be combined. If the processor is computationally powerful, a smaller number of contiguous I/O operations can be combined to fit the processor's processing performance.

Step 203, using characteristic values of the multiple combined I/O operation for model learning of neural network LSTM to obtain an I/O prediction result in the first time period.

After combining multiple I/O operations into one I/O operation, a set of I/O operation eigenvalues can be obtained. The specific I/O operation eigenvalues are variables related to the I/O timestamp, I/O type, and I/O size. In order to predict the I/O information in the first time period in the future, machine learning algorithm is generally adopted for prediction. The machine learning algorithm in this embodiment can be a neural network learning algorithm.

It should be noted that when the neural network learning algorithm is used to predict the I/O information in the first time period in the future, the known I/O information needs to be trained by the neural network learning model to obtain the neural network training model. Then I/O information in the first period of the future is predicted according to the neural network training model and the current I/O information.

The training process of the neural network learning model based on the known I/O information is described in detail in the prior art and will not be repeated here. The specific implementation process of performing neural network model learning (i.e., model reasoning) on multiple combined I/O operation eigenvalues to obtain I/O prediction information in the first time period will be described in the following embodiments and will not be repeated here.

Step 204, performing post-processing on the I/O prediction result to adjust the prediction result.

Because the prediction algorithm relies more on the selection of assumptions and features, the I/O prediction information may have a large deviation from the prediction result, and the prediction result is obviously deviated from the reality. Therefore, post-processing on the I/O prediction information is required, such as deleting abnormal predicted values in I/O prediction information to obtain normal prediction results.

In this disclosure, the process of implementing machine learning based on I/O information and predicting the I/O information in the first time period in the future are described in detail, which improves the implementability of this disclosure.

Based on the embodiments described in FIG. 2, the preprocessing of I/O information in Step 201 is described in detail below. For details, please refer to FIG. 3, a schematic diagram of refinement steps of Step 201 in the embodiments.

Step 301, calculating time interval between multiple sets of 11 operations that meet a first preset number according to the I/O timestamp.

According to the description in Step 201, suppose that after parsing the NVME instruction, the data processing device of the SSD obtains the I/O information as shown in Table 1:

TABLE 1

| timestamp | I/O type (R for reading, W for writing) | Data size (bit) |
| --- | --- | --- |
| 0.000025554 | R | 4096 |
| 0.071675595 | R | 12288 |
| 0.081838272 | R | 12288 |
| 0.096054779 | R | 12288 |
| 0.12846458 | R | 12288 |

Then, the preprocessing of I/O information is described by taking Table 1 as an example. The preprocessing is to first execute Step 301, that is, to calculate the time interval between multiple groups of I/O operations that meet the first preset number. Specifically, step 301 can calculate the time interval between 32 I/O operations, or calculate the time interval between 16 I/O operations. The selection of the preset number depends on the processing capacity of the host system, which is not specific limited here. The following is an example of 32 I/O operations.

Specifically, calculate the interval difference every 32 I/O timestamp, and calculate the interval time:

$$\text{interval} = \text{timestep}_{i+31} - \text{timestep}_i$$

Wherein, the timestep; represents the i-th timestamp of the I/O instructions.

Step 302: counting a total number of read operations and write operations of the I/O operations in each group within the time interval and the corresponding data size to obtain the first I/O information table.

After the time interval of multiple groups of I/O operations satisfying the first preset number is obtained, the sum of the times of read and write operations and the corresponding data size of the first preset number of I/O operations in each group within the said time interval are calculated.

Further, executing digital conversion on the reading and writing I/O data, the writing I/O indicated as 1, the reading I/O indicated as 0. Then each group of 32 I/Os are added up to figure out the number of reading I/Os and the number of writing I/Os, the formula is as follows:

$$ioTypeSum_j = \sum_{i=0}^{31} ioType_{32j+1}$$

$$\text{Where, } ioType_i = \begin{cases} 0, & \text{when the } i \text{ instuction is reading} \\ 1, & \text{when the } i \text{ instuction is writing} \end{cases}$$

Specifically, the total number and the corresponding data size of the read operations and write operations of the I/O operations in each group within the time interval can be calculated according to the above formula.

Step 303, executing the data size to obtain the first I/O information table.

In order to facilitate regression prediction, the size of the combined data needs to be compressed to a reasonable range (for example, 0-500). Therefore, the size of the read I/O corresponding to a set of 32 I/Os needs to be summed and then divided by 200K for compression. Similarly, the size of the write I/O corresponding to a set of 32 I/Os is summed and then divided by 200K for compression to obtain the first I/O information table as shown in Table 2.

Specifically, the size of the compression can be customized (for example, the size of the read I/O for a set of 32 I/Os can be added up and then divided by 400K or 500K for compression). As long as the size of the compressed data conforms to the data range for the regression analysis, there is no specific restriction here.

TABLE 2

| Interval | I/O Type Sum | R compression size | W compression size |
|---|---|---|---|
| 0.135241983 | 0 | 2.72 | 0 |
| 0.001069606 | 0 | 4.32 | 0 |
| 0.00145867 | 0 | 5.44 | 0 |
| 0.004233801 | 0 | 3.12 | 0 |
| 0.003147134 | 0 | 2.58 | 0 |
| 0.000673062 | 4 | 2.24 | 0.2 |
| 0.000637647 | 1 | 2.72 | 0.08 |

The time intervals in Table 2 above represent the time intervals between 32 I/O operations. The I/O type sum represents the total number of read and write operations in 32 I/O operations. For example, when the sum is 0, the 32 I/O operations are all read operations. When the sum is 4, there are 4 writes operations and 28 reads operations of the 32 I/O operations. The compressed data size of read and write operations is the compressed data size of the read and write operations in 32 I/O.

In the above embodiment, the preprocessing of I/O information is described in detail. That is, the generation process of the first I/O information table is described in detail, which improves the implementability of this disclosure.

Figure 2:
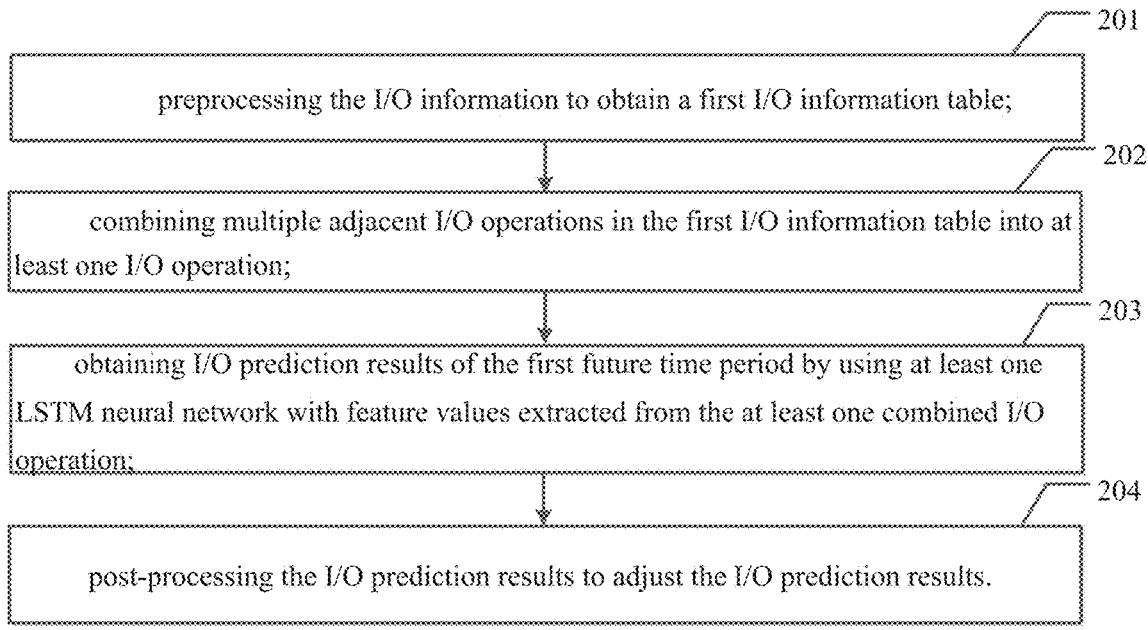
FIG. 2 is a schematic diagram of refinement steps of step 103 in the embodiment of FIG. 1 in the present disclosure.
Figure 3:
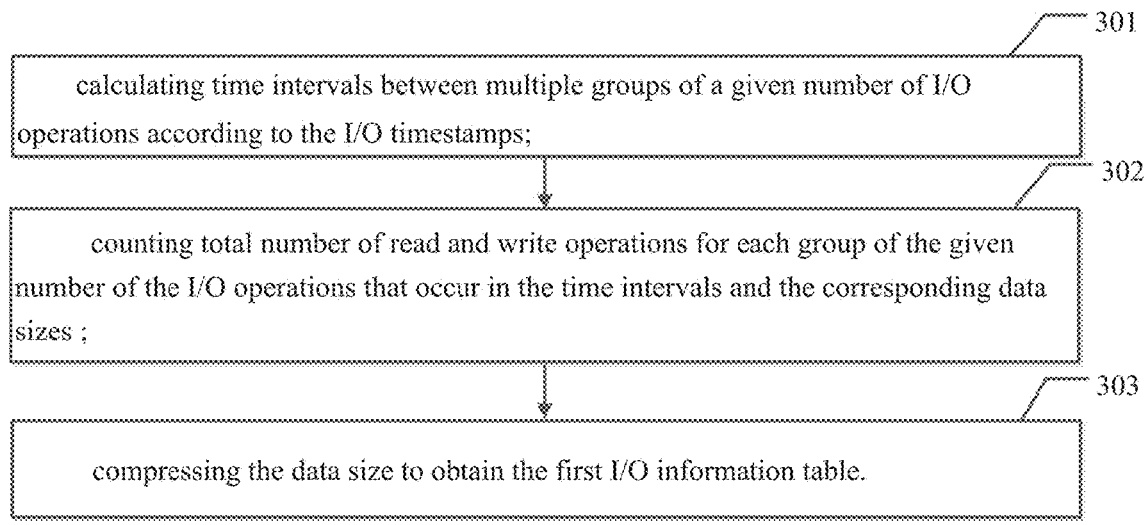
FIG. 3 is a schematic diagram of refinement steps of step 201 in the embodiment of FIG. 2 in the present disclosure.
Figure 4:
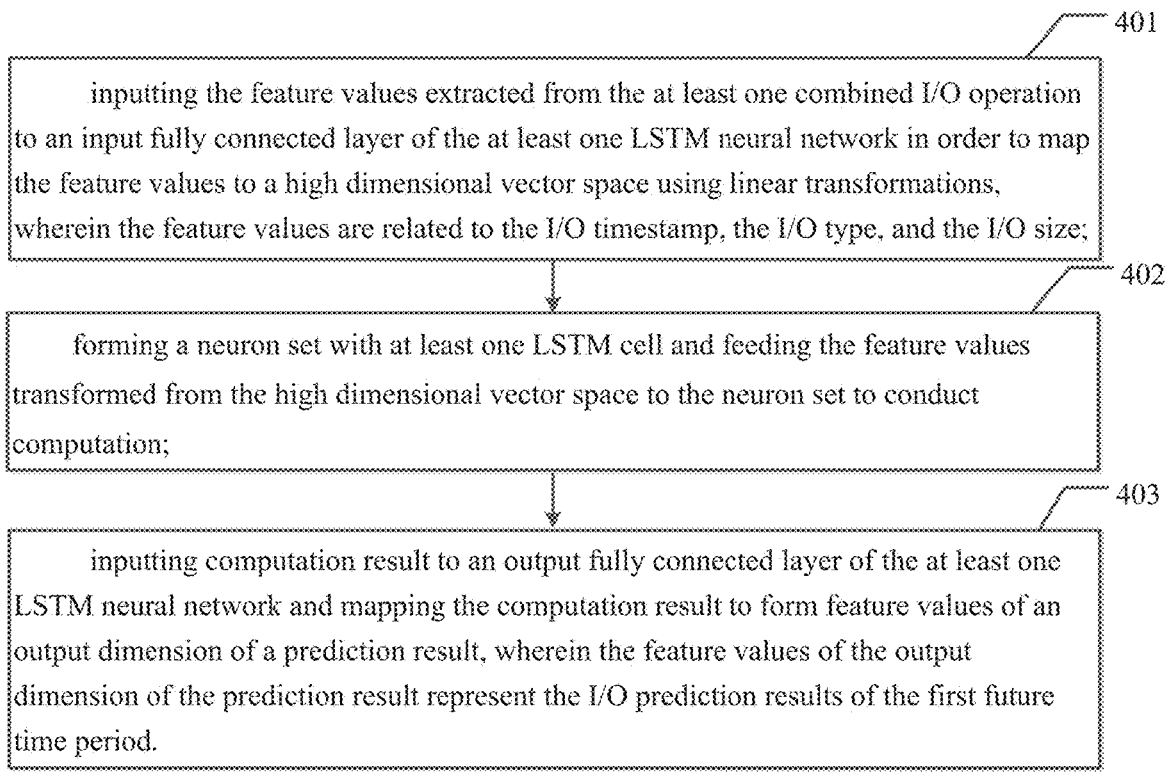
FIG. 4 is a schematic diagram of refinement steps of step 203 in the embodiment of FIG. 2 in the present disclosure.

Based on FIG. 2, the process of neural network LSTM model learning (that is, model reasoning) for multiple combined I/O eigenvalues in Step 203 is described in detail to obtain the I/O prediction information in the first period. Refer to FIG. 4 for details, which is a schematic diagram of refinement steps of Step 203 in the embodiment of FIG. 2.

Step 401, inputting the characteristic values of the multiple combined I/O operation into the input fully connected layer of the neural network to map the merged I/O operation characteristic values into a high-dimensional vector space through linear transformation; the I/O operation characteristic values are related to the I/O timestamp, the I/O type, and the I/O size.

According to the Step 202 of the embodiments described in FIG. 2, the multiple adjacent I/O operations in table 2 were merged into one I/O operation, and then the multiple combined I/O operation eigenvalues were input to the input fully connected layer of the neural network, so that the combined I/O operation eigenvalues could be mapped into a high-dimensional vector space through linear transformation. That is, mapping the eigenvalues of low-dimensional I/O operations to the eigenvalues of high-dimensional I/O operations. The I/O operation eigenvalues are related to the I/O timestamp, I/O type, and I/O size.

Specifically, the eigenvalues of each merged I/O operation can be obtained by the following method.

For example, the processed eight adjacent I/Os in Table 2 are merged into one I/O input (here merging can be understood as concatenating the processed eight adjacent I/Os in Table 2 into one I/O input). Because each I/O in Table 2 is the result of merging 32 I/Os in Table 1, merging eight adjacent I/Os in Table 2 into one I/O input is equivalent to merging 32*8=256 I/Os into one I/O input. The specific merge operation can be shown below to obtain a combined I/O operation eigenvalue. Each I/O operation eigenvalue is a variable related to the I/O timestamp, I/O type, and I/O size.

[$interval_1$, $ioTypeSum_1$, $rSize_1$, $wSize_1$, $interval_2$, $ioTypeSum_2$, $rSize_2$, $wSize_2$, . . . , $interval_8$, $ioTypeSum_8$, $rSize_8$, $wSize_8$]

After obtaining multiple combined I/O eigenvalues, the method includes inputting the multiple combined I/O eigenvalues to the input fully connected layer of the neural network, so as to map the combined I/O operation eigenvalues into a high-dimensional vector space through linear transformation. The eigenvalues of low-dimensional I/O operations are mapped to the eigenvalues of high-dimensional I/O operations to find more eigenvalues.

Specifically, you can transform a set of vectors 32*1 into a set of vectors 128*1 through the weight matrix. The specific transformation process can be $X_{128 \times 1} = W_{128 \times 32} \times S_{32 \times 1} + b_{128 \times 1}$. Wherein, $W_{128 \times 32}$ is the weight matrix and $b_{128 \times 1}$ is the offset, so as to map the 32-dimensional I/O operation eigenvalue to the 128-dimensional I/O operation eigenvalue.

Step 402, forming neuron set by a plurality of neural network cells, so that the feature values after the high-dimensional vector space mapping are sequentially input into the neuron set to perform operations to obtain the operation result.

After the eigenvalues of high-dimensional I/O operation are obtained, a neuron set is formed through multiple LSTM cells (as shown in FIG. 5, assuming that 128 LSTM cells are included in this disclosure), and the eigenvalues of high-dimensional I/O operation are input into this neuron set for calculation circularly to get the result of the operation.

Specifically, in practice, the more neurons there are in a given range, the more accurate the calculation will be. It is worth noting that too much computation will put too much load on the processor, which will affect the efficiency of real-time output. So the amount of data in a neuron cell is generally determined by the accuracy of the result and the processing power of the processor.

The following is a single neuronal cell as an example, and the calculation process of high dimensional eigenvalues is described.

Specifically, the calculation process of each neuron cell is shown in FIG. 6. The neural network architecture of each neuron cell includes input gate, forgetfulness gate and output gate, as well as new memory state and past memory state. The function of each gate or state is described in detail in prior art and will not be repeated here.

In this embodiment, it is assumed that there are 128 neurons, and the calculation results are cycled for 128 times in order to improve the accuracy of the calculation.

Step 403, inputting the operation result to the output fully connected layer of the neural network to map the operation result to the feature value of the output dimension of the prediction result, and the feature value of the output dimension of the prediction result reflects the I/O prediction result of the first time period.

After the high-dimensional feature vector value is calculated by multiple neurons, the output data from the output gate is input to the output fully connected layer of the neural network, so as to map the operation result to the output dimension of the predicted result. Among them, the specific output dimension depends on the user's choice, that is, it can be the output eigenvalue of any dimension. For example, output the eigenvalues of 32 dimensions or output the eigenvalues of 16 dimensions, or output the eigenvalues of other dimensions.

Specifically, the present disclosure illustrates the 32 dimensional value output as an example.

The process is as follows: $Y_{32\times1}=W_{32\times128}\times X_{128\times1}+b_{32\times1}$. That is, the eigenvalue of 128 dimension is mapped to the eigenvalue of 32 dimension through the weight matrix $W_{32\times128}$. Wherein, $b_{32\times1}$ is the matrix offset and represents the influence of noise in data processing.

The data processing process of FIG. 4 will be described in detail below with a specific embodiment.

Assume that in the LSTM network model, a sample input is $X=\{x1, x2 \ldots, x_T\}$, wherein T is the time step of the input sequence (tentatively T=1024). Specifically, corresponding to Step 401, each $X_T$ is 32*8=256 eigenvalues of I/O operations. Since the duration of each I/O operation is about 3 us, the time interval corresponding to 1024 x in the input sample is about 32*8*3*1024≈1s. The output of the model after Step 403 is $Y=\{y1, y2 \ldots, y16, y17 \ldots, y32\}$, wherein y1, y2 ..., y16 is the predicted value of the size of future read operations at intervals of 50 ms. In other words, they are the predictive value of the size of intensity of read operations in the future, for 0~50 ms, 50~100 ms, ... 750 ms~800 ms respectively. And y17, y18 ..., y32 is the predicted size of future write operations every 50 ms. In other words, they are the predictive value of the size of intensity of write operations in the future, for 0~ 50 ms, 50~100 ms, ... 750 ms~800 ms respectively.

It should be noted that when the neural network model is used to forecast the I/O information in the first time period in the future, the amount of historical data is generally required to be greater than the amount of predicted data. For example, in this embodiment, the actual I/O information in 1s is used to predict the I/O information in the future 800 ms, and in order to improve the accuracy, it can also be used to predict the I/O information in the future 400 ms. Generally speaking, the larger the amount of historical data is and the smaller the amount of forecast data is, the higher the corresponding prediction accuracy will be, and vice versa. For the Y value of the model output, y1, y2 ..., y16 can also be a predicted value of the size of future write operations at every 50 ms interval, and y17, y18 ..., y32 can be the predicted value of the size of future read operations at every 50 ms interval. In other words, the output value of Y mainly depends on the previous model training process. If in the early model training process, y1, y2 ..., y16 is the predicted value of the size of future read operations at intervals of 50 ms. Then, when the model outputs later, y1, y2 ..., y16 is the predicted value of the size of read operations at intervals of 50 ms.

Based on the embodiments described in FIG. 1 to FIG. 4, the accuracy of the predicted I/O value can also be evaluated by the first formula after the predicted value is obtained. For details, see FIG. 7, another embodiment of the SSD data processing approach in this disclosure, including the followings.

Step 701: evaluating the prediction result through the first formula to evaluate the accuracy of the prediction result.

The first formula includes:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

The r represents the accuracy of prediction result, and the $x_i$ indicates the actual intensity of the current I/O, the $y_i$ represents the predicted I/O intensity, the $\bar{x}$ represents the average value of multiple $x_i$, and the $\bar{y}$ represents the average value of multiple $y_i$. In some embodiments, the intensity of an I/O is represented by the size of an I/O.

Specifically, after obtaining the predicted I/O value in the first period, the accuracy of the predicted I/O value can also be evaluated through the first formula. Wherein the $x_i$ indicates the actual intensity of the current I/O, the $y_i$ represents the predicted I/O intensity, the $\bar{x}$ represents the average value of multiple $x_i$, and the $\bar{y}$ represents the average value of multiple $y_i$. In some embodiments, the intensity of an I/O is represented by the size of an I/O.

In the present embodiment, a detailed description of the first formula for evaluating prediction results is described in detail, and the implementability of the present disclosure is improved.

Figure 8:
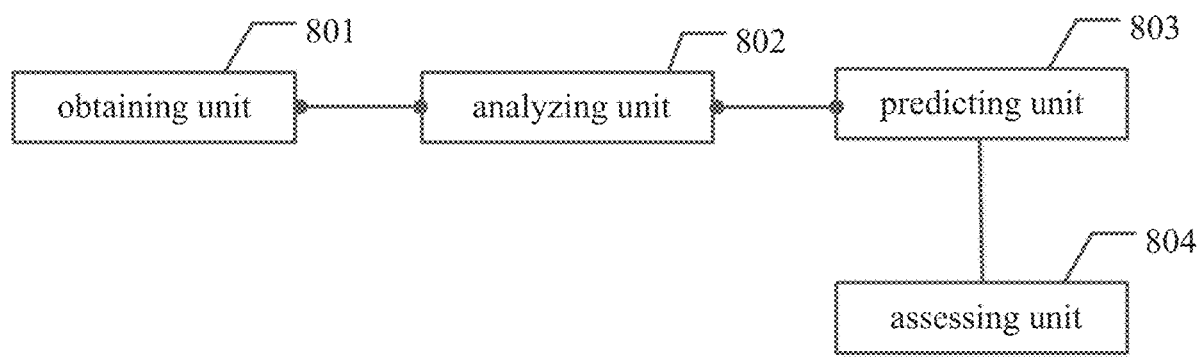
FIG. 8 is a schematic view showing a data device of a solid state drive according to an embodiment of the present disclosure.

The data processing method for a solid state drive in an embodiment of this disclosure is described above and the data processing device for a solid state drive in an embodiment of this disclosure is described below. Refer to FIG. 8, an embodiment of a data processing device for a solid state drive in this disclosure includes the following: an obtaining unit 801, configured to acquire the interface protocol instruction received by the SSD; an analyzing unit 802, configured to parse the interface protocol instruction to acquire I/O information in the protocol instruction; and the I/O information includes at least: I/O timestamp, I/O type, and I/O size; and a predicting unit 803, configured to perform machine learning on the I/O information to predict the I/O information for the first time period in the future, so that the processor of the SSD performs SSD management actively according to the prediction result.

In some embodiments, the predicting unit 803 is specifically configured to: preprocess on the I/O information to obtain a first I/O information table; combine multiple adjacent I/O operations in the first I/O information table into one I/O operation; use characteristic values of the multiple combined U/O operation for model learning of neural network LSTM to obtain an I/O prediction result in the first time period; and perform post-processing on the I/O prediction result to adjust the prediction result.

In some embodiments, the predicting unit 803 is specifically further configured to: calculate time interval between multiple sets of I/O operations that meet a first preset number according to the I/O timestamp; count a total number of read operations and write operations of the I/O operations in each group within the time interval and the corresponding data size to obtain the first I/O information table.

In some embodiments, the predicting unit 803 is specifically further configured to input the characteristic values of the multiple combined I/O operation into the input fully connected layer of the neural network to map the merged I/O operation characteristic values into a high-dimensional vector space through linear transformation; the I/O operation characteristic values are related to the I/O timestamp, the I/O type, and the I/O size. The predicting unit 803 is also configured to form a neuron set with at least one LSTM cell, so that the feature values after the high dimensional vector space mapping are sequentially input into the neuron set to perform operations to obtain the operation result. The predicting unit 803 is further configured to input the operation result to the output fully connected layer of the neural network to map the operation result to the feature value of the output dimension of the prediction result, and the feature value of the output dimension of the prediction result reflects the I/O prediction result of the first time period.

In some embodiments, the predicting unit 803 is specifically configured to input the feature values after the mapping of the high dimensional vector space sequentially into the network architecture of each neuron cell for calculation; the network architecture includes an input gate, a forget gate and an output gate.

In some embodiments, the time interval corresponding to the multiple combined I/O operation feature values is greater than the first time period.

In some embodiments, the solid-state disk management includes cache management, garbage collection, or instruction queue management.

In some embodiments, the device further includes a assessing unit 804, which can be used to assess the prediction results through the first formula to evaluate the accuracy of the prediction result;

The first formula includes:

$$r = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}}$$

The r represents the accuracy of prediction result, and the $x_i$ indicates the actual intensity of the current I/O, the $y_i$ represents the predicted I/O intensity, the $\bar{x}$ represents the average value of multiple $x_i$, and the $\bar{y}$ represents the average value of multiple $y_i$. In some embodiments, the intensity of an I/O is represented by the size of an I/O.

It should be noted that the function of the above units is similar to those described in FIGS. 1-7, and details are not described herein again.

In this disclosure, the interface protocol instruction received by SSD is first obtained by obtaining unit 801, and then the interface protocol instruction is parsed through the analyzing unit 802 to obtain the I/O information in the protocol instruction. The I/O information includes at least I/O timestamp, I/O type, and I/O size. The machine learning is performed on the I/O information to predict the I/O information in the first time period in the future through the predicting unit 803, so that the SSD processor can actively execute and optimize the SSD management according to the prediction results. In the present disclosure, through machine learning algorithm, the I/O information of the first time period in the future can be predicted actively according to the current I/O information, so that the SSD processor can execute the SSD management actively according to the predicted results, so as to improve the performance of the SSD and reduce the response time of data operation.

The data processing device for a solid state drive in an embodiment of this disclosure has been described above from the perspective of a modular functional entity and a computer device in an embodiment of this disclosure is described below from the perspective of a hardware processing.

The computer device is used to implement the data processing device of the SSD, and one embodiment of the computer apparatus in the present disclosure includes a processor and a memory. The memory is used to store computer programs, and when the processor is used to execute computer programs stored in memory, the following steps can be achieved: acquiring the interface protocol command received by the solid state drive; parsing the interface protocol command to obtain I/O information in the protocol command, wherein the I/O information includes at least I/O timestamp, I/O type, and I/O size; and performing machine learning on the I/O information to predict the I/O information in the first time in the future, so that the processor of the solid state drive performs management actively according to the prediction result.

In some embodiments of the present disclosure, the processor can also be used to achieve the following steps: preprocessing on the I/O information to obtain a first I/O information table; combining multiple adjacent I/O operations in the first I/O information table into one I/O operation; obtaining I/O prediction results of the first future time period by using at least one LSTM neural network with feature values extracted from the at least one combined I/O operation; and post-processing the I/O prediction results to adjust the I/O prediction results.

In some embodiments of the present disclosure, the processor can also be used to achieve the following steps: calculating time intervals between multiple groups of a given number of I/O operations according to the I/O timestamps; and counting total number of read and write operations for each group of the given number of the I/O operations that occur in the time intervals and the corresponding data sizes to obtain the first I/O information table.

In some embodiments of the present disclosure, the processor can also be used to achieve the following steps: inputting the feature values extracted from the at least one combined I/O operation to an input fully connected layer of the at least one LSTM neural network in order to map the feature values to a high dimensional vector space using linear transformations, wherein the feature values are related to the I/O timestamp, the I/O type, and the I/O size; forming a neuron set with at least one LSTM cell and feeding the feature values transformed from the high dimensional vector space to the neuron set to conduct computation; and inputting computation result to an output fully connected layer of the at least one LSTM neural network and mapping the computation result to form feature values of an output dimension of a prediction result, wherein the feature values of the output dimension of the prediction result represent the I/O prediction results of the first future time period.

In some embodiments of the present disclosure, the processor can also be used to achieve the following steps: feeding the feature values transformed from the high dimensional vector space to network architecture of each LSTM cell to conduct computation, wherein the network architecture comprises an input gate, a forget gate and an output gate.

In some embodiments of the present disclosure, the processor can also be used to achieve the following steps:

assessing the prediction results through the first formula to evaluate the accuracy of the prediction results. The first formula includes:

$$r = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}}$$

The r represents the accuracy of prediction result, and the $x_i$ indicates the actual intensity of the current I/O, the $y_i$ represents the predicted I/O intensity, the $\bar{x}$ represents the average value of multiple $x_i$, and the $\bar{y}$ represents the average value of multiple $y_i$. In some embodiments, the intensity of an I/O is represented by the size of an I/O.

It will be appreciated that when the processor in the above-described described computer device performs the computer program, the function of each unit in each of the corresponding device embodiments may be realized, and details are not described herein again. Exemplary, the computer program can be split into one or more modules/units, the one or more modules/units being stored in the memory and is performed by the processor to complete this application. The one or more modules/units may be a series of computer program instruction segments capable of completing a particular function, the instruction segment for describing the execution process of the computer program in the data processing apparatus of the solid state drive. For example, the computer program can be divided into each unit in a data processing apparatus of the SSD, and each unit can implement a particular function illustrated by the data processing apparatus such as the corresponding sSSD.

The computer device can be computing devices such as table-top computers, notebooks, handheld computers and cloud servers. The computer device can include, but is not limited to the processor, a memory. Those skilled in the art will appreciate that the processor, memory is merely an example of a computer device, and does not constitute a limitation to the computer device, it can include more or fewer components, or a combination of certain components, or different components; for example the computer device can also include an input and output devices, a network access device, a bus, and so on.

The processor can be a central processing unit (CPU), as well as other general purpose processors, Digital Signal Processor (DSP), Application Specific Integrated Circuit (ASIC), Field-Programmable Gate Array (FPGA), or other programmable logic devices, separate doors or transistor logic devices, discrete hardware components, and so on. The general purpose processor can be a microprocessor or the processor can be any conventional processor, etc. The processor is a control center of the computer device, using various interfaces and lines to connect components of the entire computer device.

The memory can be used to store the computer program and/or module, the processor implements the computer by running or executing a computer program and/or module stored in the memory, and is invoking data stored in the memory to implement various functions of the device. The memory can primarily include a storage program area and a storage data area, wherein the storage program area can store the operating system, the application required for at least one function, etc.; the storage data area can store data created according to the use of the terminal. In addition, memory can include high-speed random access memory, and also non-volatile memory, such as hard disk, memory, plug-in hard disk, smart media card (SMC), secure digital (SD) card, Flash card, at least one disk storage device, flash device, or other volatile solid state storage device.

The disclosure also provides a computer readable storage medium, which is used to realize the function of the application startup system and on which a computer program is stored; when the computer program is executed by a processor, the processor can be used to perform the following steps: acquiring the interface protocol command received by the solid state drive; parsing the interface protocol command to obtain I/O information in the protocol command, wherein the I/O information includes at least I/O timestamp, I/O type, and I/O size; and performing machine learning on the I/O information to predict the I/O information in the first time in the future, so that the processor of the solid state drive performs management actively according to the prediction result.

In some embodiments of this disclosure, when a computer program stored on a computer readable storage medium is executed by a processor, the processor can be specifically used to perform the following steps: preprocessing on the I/O information to obtain a first I/O information table; combining multiple adjacent I/O operations in the first I/O information table into at least one I/O operation; obtaining I/O prediction results of the first future time period by using at least one LSTM neural network with feature values extracted from the at least one combined I/O operation; and post-processing the I/O prediction results to adjust the I/O prediction results.

In some embodiments of this disclosure, when a computer program stored on a computer readable storage medium is executed by a processor, the processor can be specifically used to perform the following steps: calculating time interval between multiple sets of I/O operations that meet a first preset number according to the I/O timestamp; and counting a total number of read operations and write operations of the I/O operations in each group within the time interval and the corresponding data size to obtain the first I/O information table.

In some embodiments of this disclosure, when a computer program stored on a computer readable storage medium is executed by a processor, the processor can be specifically used to perform the following steps: inputting the feature values extracted from the at least one combined I/O operation to an input fully connected layer of the at least one LSTM neural network in order to map the feature values to a high dimensional vector space using linear transformations, wherein the feature values are related to the I/O timestamp, the I/O type, and the I/O size; forming a neuron set with at least one LSTM cell, and feeding the feature values transformed from the high dimensional vector space to the neuron set to conduct computation; and inputting the computation result to the output fully connected layer of the neural network to map the computation result to the feature value of the output dimension of the prediction result, and the feature value of the output dimension of the prediction result reflects the I/O prediction result of the first time period.

In some embodiments of this disclosure, when a computer program stored on a computer readable storage medium is executed by a processor, the processor can be specifically used to perform the following steps: feeding the feature values transformed from the high dimensional vector space to network architecture of each LSTM cell to conduct computation. The network architecture includes an input gate, a forget gate and an output gate.

In some embodiments of this disclosure, when a computer program stored on a computer readable storage medium is executed by a processor, the processor can be specifically used to perform the following steps: assessing the prediction result through the first formula to evaluate the accuracy of the prediction result. The first formula includes:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

The r represents the accuracy of prediction result, and the $x_i$ indicates the actual intensity of the current I/O, the $y_i$ represents the predicted I/O intensity, the $\bar{x}$ represents the average value of multiple $x_i$, and the $\bar{y}$ represents the average value of multiple $y_i$. In some embodiments, the intensity of an I/O is represented by the size of an I/O.

It will be appreciated that if the integrated unit is implemented in the form of a software functional unit and is used as a separate product sales or in use, it can be stored in a respective computer readable storage medium. Based on this, the present disclosure implements all or part of the above-described corresponding embodiment method, or can be done by a computer program to instruct the associated hardware, the computer program can be stored in a computer readable storage medium, when executed by the processor, the steps of the various method embodiments can be implemented. Wherein, the computer program includes a computer program code that can be a source code form, an object code form, an executable file, or some intermediate form. The computer readable medium can include any entity or device capable of carrying the computer program code, a recording medium, a U disk, a mobile hard disk, a disk, an optical disk, a computer memory, a read-only memory (ROM), random access memory (RAM), electrical carrier signal, telecommunications signal, and software distribution media. It should be noted that the contents of the computer readable medium can be appropriately increased and decreased according to the requirements of legislation and patent practice within the judicial jurisdiction, such as in some jurisdiction, according to legislation and patent practice, computer readable media Does not include electrical carrier signals and telecommunications signals.

Those skilled in the art will clearly understand that in order to describe convenient and concise, the specific operation of the above-described system, apparatus, and unit, can refer to the corresponding process in the foregoing method embodiment, and will not be described herein.

In several embodiments provided herein, it should be understood that the disclosed systems, apparatus, and methods can be implemented in other ways. For example, the device embodiment described above is merely a schematic, for example, the division of the unit is only a logic function division, and there may be additional division mode, such as a plurality of units or components, may be combined or can be integrated into another system, or some features can be ignored, or not executed. In addition, the coupling or direct coupling or communication connections displayed or discussed may be an electrical, mechanical or other form.

The unit as the separation member may be or may not be physically separated, and the components displayed as the unit may be or may not be a physical unit, i.e., in one place, or can be distributed to a plurality of network elements. The object of the present embodiment can be implemented in accordance with the actual needs to select some or all units.

Further, each of the functional units in the various embodiments of the present disclosure may be integrated into one processing unit, or each unit can be generated separately, or two or more units can be integrated into one unit. The above-described integrated units can be implemented in the form of hardware, or may be implemented in the form of a software functional unit.

As described above, the above embodiments are intended to illustrate the technical solutions of the present disclosure, not to limit them; although the foregoing embodiments have been described in detail, those of ordinary skill in the art will understand that they can still modify the technical solutions described in the various embodiments, or replace part of the technical features; these modifications or replacements does not depart the nature of the corresponding technical solutions from the spirit and scope of the present disclosure.

What is claimed is:

1. A method for data processing applied to a solid state drive, comprising:
    acquiring an interface protocol command received by the solid state drive;
    parsing the interface protocol command to obtain I/O information from the interface protocol command, wherein the I/O information comprises at least one I/O timestamp, an I/O type, and an I/O size;
    invoking machine learning based on the I/O information to predict I/O information of a first future time period, comprising:
        preprocessing the I/O information to obtain a first I/O information table stored in the solid state drive;
        combining multiple adjacent I/O operations in the first I/O information table into at least one I/O operation;
        obtaining I/O prediction results of the first future time period by using at least one long-short term memory (LSTM) neural network with feature values extracted from the at least one combined I/O operation; and
        post-processing the I/O prediction results to adjust the I/O prediction results; and
    assessing the I/O prediction results by using a first formula to evaluate an accuracy of the I/O prediction results, wherein the first formula comprises:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

wherein r represents an accuracy rate, $x_i$ represents an actual intensity of the I/O operation, $y_i$ represents a predicted I/O intensity, $\bar{x}$ represents an average value of a set of $x_i$, and $\bar{y}$ represents an average value of a set of $y_i$, so that a processor of the solid state drive is configured to proactively execute solid state drive management functions according to the I/O prediction results.

2. The method of claim 1, wherein preprocessing the I/O information to obtain the first I/O information table, further comprises:

calculating time intervals between multiple groups of a given number of I/O operations according to the I/O timestamp; and counting total number of read and write operations for each group of the given number of the I/O operations that occur in the time intervals and the corresponding data sizes to obtain the first I/O information table.

3. The method of claim 1, wherein obtaining the I/O prediction results of the first future time period by using the at least one LSTM neural network with the feature values extracted from the at least one combined I/O operation, further comprises:

inputting the feature values extracted from the at least one combined I/O operation to an input fully connected layer of the at least one LSTM neural network in order to map the feature values to a high dimensional vector space using linear transformations, wherein the feature values are related to the I/O timestamp, the I/O type, and the I/O size;

forming a neuron set with at least one LSTM cell and feeding the feature values transformed from the high dimensional vector space to the neuron set to conduct computation; and inputting computation result to an output fully connected layer of the at least one LSTM neural network and mapping the computation result to form feature values of an output dimension of a prediction result, wherein the feature values of the output dimension of the prediction result represent the I/O prediction results of the first future time period.

4. The method of claim 3, wherein the feeding the feature values transformed from the high dimensional vector space to the neuron set to conduct computation, further comprises:

feeding the feature values transformed from the high dimensional vector space to network architecture of each LSTM cell to conduct computation, wherein the network architecture comprises an input gate, a forget gate and an output gate.

5. The method of claim 3, wherein a corresponding time interval of the feature values extracted from the at least one combined I/O operation is longer than the first future time period.

6. The method of claim 1, wherein the solid state drive management functions comprises cache management, garbage collection, or command queue management.

7. A computer device comprising a processor, wherein the processor is used to implement a data processing method applied to a solid state drive when executing a computer program, the method comprising:

acquiring an interface protocol command received by the solid state drive;

parsing the interface protocol command to obtain I/O information from the interface protocol command, wherein the I/O information comprises at least one I/O timestamp, an I/O type, and an I/O size; and invoking machine learning based on the I/O information to predict I/O information of a first future time period, comprising:

preprocessing the I/O information to obtain a first I/O information table stored in the solid state drive;

combining multiple adjacent I/O operations in the first I/O information table into at least one I/O operation;

obtaining I/O prediction results of the first future time period by using at least one long-short term memory (LSTM) neural network with feature values extracted from the at least one combined I/O operation; and post-processing the I/O prediction results to adjust the I/O prediction results; and assessing the I/O prediction results by using a first formula to evaluate an accuracy of the I/O prediction results, wherein the first formula comprises:

$$r = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}}$$

wherein r represents an accuracy rate, $x_i$ represents an actual intensity of the I/O operation, $y_i$ represents a predicted I/O intensity, $\bar{x}$ represents an average value of a set of $x_i$, and $\bar{y}$ represents an average value of a set of $y_i$, so that a processor of the solid state drive is configured to proactively execute solid state drive management functions according to the I/O prediction results.

8. The computer device of claim 7, wherein preprocessing the I/O information to obtain the first I/O information table, further comprises:

calculating time intervals between multiple groups of a given number of I/O operations according to the I/O timestamp; and counting total number of read and write operations for each group of the given number of the I/O operations that occur in the time intervals and the corresponding data sizes to obtain the first I/O information table.

9. The computer device of claim 7, wherein obtaining the I/O prediction results of the first future time period by using the at least one LSTM neural network with the feature values extracted from the at least one combined I/O operation, further comprises:

inputting the feature values extracted from the at least one combined I/O operation to an input fully connected layer of the at least one LSTM neural network in order to map the feature values to a high dimensional vector space using linear transformations, wherein the feature values are related to the I/O timestamp, the I/O type, and the I/O size;

forming a neuron set with at least one LSTM cell and feeding the feature values transformed from the high dimensional vector space to the neuron set to conduct computation; and inputting computation result to an output fully connected layer of the at least one LSTM neural network and mapping the computation result to form feature values of an output dimension of a prediction result, wherein the feature values of the output dimension of the prediction result represent the I/O prediction results of the first future time period.

10. The computer device of claim 9, wherein the feeding the feature values transformed from the high dimensional vector space to the neuron set to conduct computation, further comprises:

feeding the feature values transformed from the high dimensional vector space to network architecture of each LSTM cell to conduct computation, wherein the network architecture comprises an input gate, a forget gate and an output gate.

11. The computer device of claim 9, wherein a corresponding time interval of the feature values extracted from the at least one combined I/O operation is longer than the first future time period.

12. The computer device of claim 7, wherein the solid state drive management functions comprises cache management, garbage collection, or command queue management.

13. A non-transitory computer-readable storage medium with a computer program stored thereon, wherein when the computer program is executed by a processor, the processor is configured to implement a data processing method applied to a solid state drive, and the method comprises:
  acquiring an interface protocol command received by the solid state drive;
  parsing the interface protocol command to obtain I/O information from the interface protocol command, wherein the I/O information comprises at least one I/O timestamp, an I/O type, and an I/O size; and
  invoking machine learning based on the I/O information to predict I/O information of a first future time period, comprising:
    preprocessing the I/O information to obtain a first I/O information table stored in the solid state drive;
    combining multiple adjacent I/O operations in the first I/O information table into at least one I/O operation;
    obtaining I/O prediction results of the first future time period by using at least one long-short term memory (LSTM) neural network with feature values extracted from the at least one combined I/O operation; and
    post-processing the I/O prediction results to adjust the I/O prediction results; and
  assessing the I/O prediction results by using a first formula to evaluate an accuracy of the I/O prediction results, wherein the first formula comprises:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

wherein r represents an accuracy rate, $x_i$ represents an actual intensity of the I/O operation, $y_i$ represents a predicted I/O intensity, $\bar{x}$ represents an average value of a set of $x_i$, and $\bar{y}$ represents an average value of a set of $y_i$, so that a processor of the solid state drive is configured to proactively execute solid state drive management functions according to the I/O prediction results.

14. The non-transitory computer-readable storage medium of claim 13, wherein preprocessing the I/O information to obtain the first I/O information table, further comprises:
  calculating time intervals between multiple groups of a given number of I/O operations according to the I/O timestamp; and
  counting total number of read and write operations for each group of the given number of the I/O operations that occur in the time intervals and the corresponding data sizes to obtain the first I/O information table.

15. The non-transitory computer-readable storage medium of claim 13, wherein obtaining the I/O prediction results of the first future time period by using the at least one LSTM neural network with the feature values extracted from the at least one combined I/O operation, further comprises:
  inputting the feature values extracted from the at least one combined I/O operation to an input fully connected layer of the at least one LSTM neural network in order to map the feature values to a high dimensional vector space using linear transformations, wherein the feature values are related to the I/O timestamp, the I/O type, and the I/O size;
  forming a neuron set with at least one LSTM cell and feeding the feature values transformed from the high dimensional vector space to the neuron set to conduct computation; and
  inputting computation result to an output fully connected layer of the at least one LSTM neural network and mapping the computation result to form feature values of an output dimension of a prediction result, wherein the feature values of the output dimension of the prediction result represent the I/O prediction results of the first future time period.

* * * * *